(12) United States Patent
Watanabe

(10) Patent No.: US 6,447,323 B1
(45) Date of Patent: Sep. 10, 2002

(54) POWER SOURCE CABLE CONNECTOR

(76) Inventor: Mitsutoshi Watanabe, 2-8-1-201, Kajigaya, Takatsu-ku, Kawasaki-shi, Kanagawa-ken (JP)

(*) Notice: Subject to any disclaimer, the term of this patent is extended or adjusted under 35 U.S.C. 154(b) by 0 days.

(21) Appl. No.: 09/948,684

(22) Filed: Sep. 10, 2001

(30) Foreign Application Priority Data

Jun. 22, 2001 (JP) ........................................ 2001-189510

(51) Int. Cl.$^7$ .............................................. H01R 13/62
(52) U.S. Cl. ...................... 439/371; 439/583; 439/578; 439/675; 174/84; 285/373
(58) Field of Search ................... 439/371, 578, 439/583, 585, 836, 675, 63, 825, 274–283, 247, 248, 608, 676, 607, 322, 350, 356, 369, 367, 799; 174/84, 84 C; 285/322, 369, 373

(56) References Cited

U.S. PATENT DOCUMENTS

| | | | | |
|---|---|---|---|---|
| 4,095,826 A | * | 6/1978 | Borradori | 285/330 |
| 4,719,315 A | * | 1/1988 | Grgorac | 174/73 |
| 5,397,859 A | * | 3/1995 | Robertson et al. | 174/92 |
| 5,620,330 A | * | 4/1997 | Pizon | 439/350 |
| 5,791,698 A | * | 8/1998 | Wartluft et al. | 285/328 |

FOREIGN PATENT DOCUMENTS

JP           3075717           6/2000

* cited by examiner

Primary Examiner—Renee Luebke
Assistant Examiner—Phuong Chi Nguyen
(74) Attorney, Agent, or Firm—Wenderoth, Lind Ponack, L.L.P.

(57) ABSTRACT

An internally fitting cylindrical portion 14 formed on a front end of a second cylindrical casing 6 is fitted into an externally fitting cylindrical portion 13 formed on a front end of a first cylindrical casing 5. A rod-like plug 2 housed in the first cylindrical casing 5 is inserted into a cylindrical receptacle 4 housed in the second cylindrical casing 6, thereby connecting first and second power source cables 1, 3 together. A cylindrical protector 39 is externally fitted to an outer periphery of a fitting portion between the externally fitting cylindrical portion 13 and the internally fitting cylindrical portion 14. One end of the cylindrical protector 39 is engaged with an outer peripheral surface of a basal portion of the externally fitting cylindrical portion 13, and the other end of the cylindrical protector 39 is engaged with an outer peripheral surface of a basal portion of the internally fitting portion 14.

22 Claims, 6 Drawing Sheets

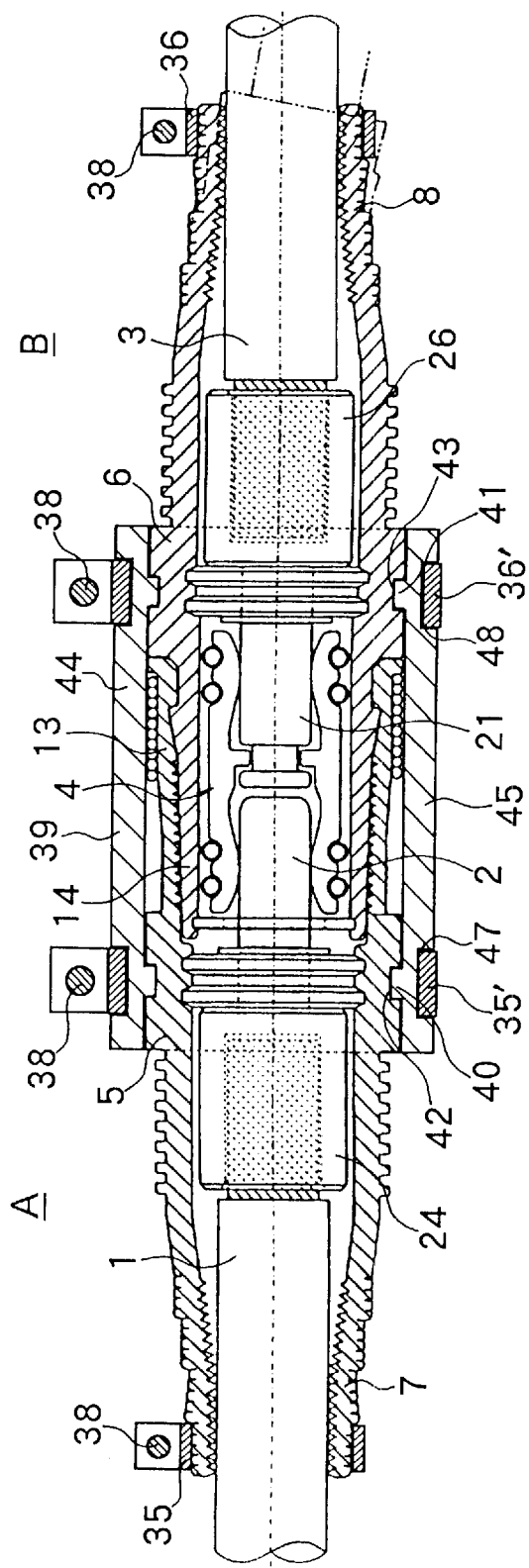

POWER SOURCE CABLE CONNECTOR

BACKGROUND OF THE INVENTION

1. Field of the Invention

This invention relates to a connector for supplying a large electric power which is used for connecting a power source cable to another power source cable.

2. Related Art

The present invention is an associated invention of Japanese patent No. 3075717 owned by the present applicant. FIGS. 1 to 8 showing one embodiment of the present invention includes a basic construction of the Japanese patent No. 3075717.

The invention disclosed by the Japanese patent No. 3075717 includes a rod-like plug 2 for connecting a terminal of a first power source cable 1, a cylindrical receptacle 4 for connecting a terminal of a second power source cable 3, a first cylindrical casing 5 housing therein the rod-like plug 2 and a second cylindrical casing 6 housing therein the cylindrical receptacle 4.

It further includes a first cable inlet cylindrical portion 7 formed on a rear end of the first cylindrical casing 5, a second cable inlet cylindrical portion 8 formed on a rear end of the second cylindrical casing 6, an externally fitting cylindrical portion 13 formed on a front end portion of the first cylindrical casing 5 and an internally fitting cylindrical portion 14 formed on a rear end of the second cylindrical casing 6.

By fitting the internally fitting cylindrical portion 14 into the externally fitting cylindrical portion 13 and inserting the rod-like plug 2 into the cylindrical receptacle 4, the first and second power source cables 1, 3 are connected together.

In the power source cable connector of the Japanese patent No. 3075717, the externally fitting cylindrical portion 13 provided on the front end portion of the first cylindrical casing 5 and the internally fitting cylindrical portion 14 provided on the front end portion of the second cylindrical casing 6 are fitted to each other. An annular claw 29 provided on an inner peripheral surface of the front end of the externally fitting cylindrical portion 13 is engaged with an annular engagement groove 30 provided on an outer peripheral surface of a basal end of the internally fitting cylindrical portion 14 so that the first cylindrical casing 5 and the second cylindrical casing 6 are not disengaged from each other.

SUMMARY OF THE INVENTION

It is, therefore, an object of the present invention to provide a power source cable connector which is capable of better ensuring the disengagement effect, and which is capable of protecting the connection between the rod-like plug 2 disposed at the inside of the internally fitting cylindrical portion 14 and the cylindrical receptacle 4.

A second object of the present invention is to provide a power source cable connector which is capable of reinforcing the fluid tightness at the fitting portion between the externally fitting cylindrical portion 13 and the internally fitting cylindrical portion 14.

In the power source connector of the present invention, it is indispensable to provide a seal for ensuring the fluid-tightness at the cable terminal inlet portion on each rear end of the first and second cylindrical casings 5, 6. On the other hand, in the power source cable connector of the Japanese patent No. 3075717, a plurality of annular ribs 16 are juxtaposed on the inner peripheral surfaces of the first and second cable inlet cylindrical portions 7, 8 about a connector axis and in an axial direction. The annular ribs 16 are intimately contacted, in their compressed states, with the outer peripheral surfaces of the first and second power source cables 1, 3, thereby realizing a fluid tight condition.

A further object of the present invention is to provide a power source cable connector which is capable of better ensuring the effect of fluid tightness, and which is capable of stably retaining the connection even against a tensile force and a twisting force exerted to the first and second power source cables 1, 3.

According to the present invention, in the power source cable connector of the Japanese patent No. 3075717, a cylindrical protector is externally fitted to an outer periphery of the fitting portion between the externally fitting cylindrical portion and the internally fitting cylindrical portion. One end of the cylindrical protector is engaged with an outer peripheral surface at a basal portion of the externally fitting cylindrical portion, and the other end of the cylindrical protector is engaged with an outer peripheral surface at a basal portion of the internally fitting cylindrical portion. Thus, the effect of fluid tightness at the fitting portion is enhanced, and the connection is stably retained against a tensile force at the fitting portion. At the same time, the connection through a rod-like plug and a cylindrical receptacle is protected against an external impact at the fitting portion.

Moreover, the present invention keeps employing the construction in which a cylindrical protector is externally fitted to an outer periphery of a fitting portion between the externally fitting cylindrical portion and the internally fitting cylindrical portion. One end of the cylindrical protector is engaged with an outer peripheral surface of a basal portion of the externally fitting cylindrical portion, and the other end of the cylindrical protector is engaged with an outer peripheral surface of a basal portion of the internally fitting portion. Furthermore, an outer peripheral surface of the first cable inlet cylindrical portion is tightened with a tightening band, and an outer peripheral surface of the second cable inlet cylindrical portion is tightened with a tightening band. In addition, annular ribs juxtaposed on inner peripheral surfaces of the first and second cable inlet cylindrical portions tightly contact, in their compressed states, outer peripheral surfaces of the first and second power source cables to realize a fluid tight condition and to wholesomely maintain the connection between the power source cables 1, 3 against a tensile force and a twisting force exerted upon the respective cables 1, 3.

The cylindrical protector is fabricated of a split cylindrical body. After the cylindrical protector is attached to the fitting portion between the casings 5, 6, the split cylindrical body is tightened with a tightening band. Owing to this feature, the attachment can be made easily.

BRIEF DESCRIPTION OF THE DRAWINGS

FIG. 3(A) is a vertical sectional view showing the connecting state of FIG. 2 but with a cylindrical protector and a fastening band attached to the first and second cylindrical connectors, and FIG. 3 (B) is a cross sectional view of a part to which the cylindrical protector is attached;

DETAILED DESCRIPTION OF THE INVENTION

One embodiment of the present invention will now be described with reference to FIGS. 1 to 8 of the accompanying drawing.

Figure 1:
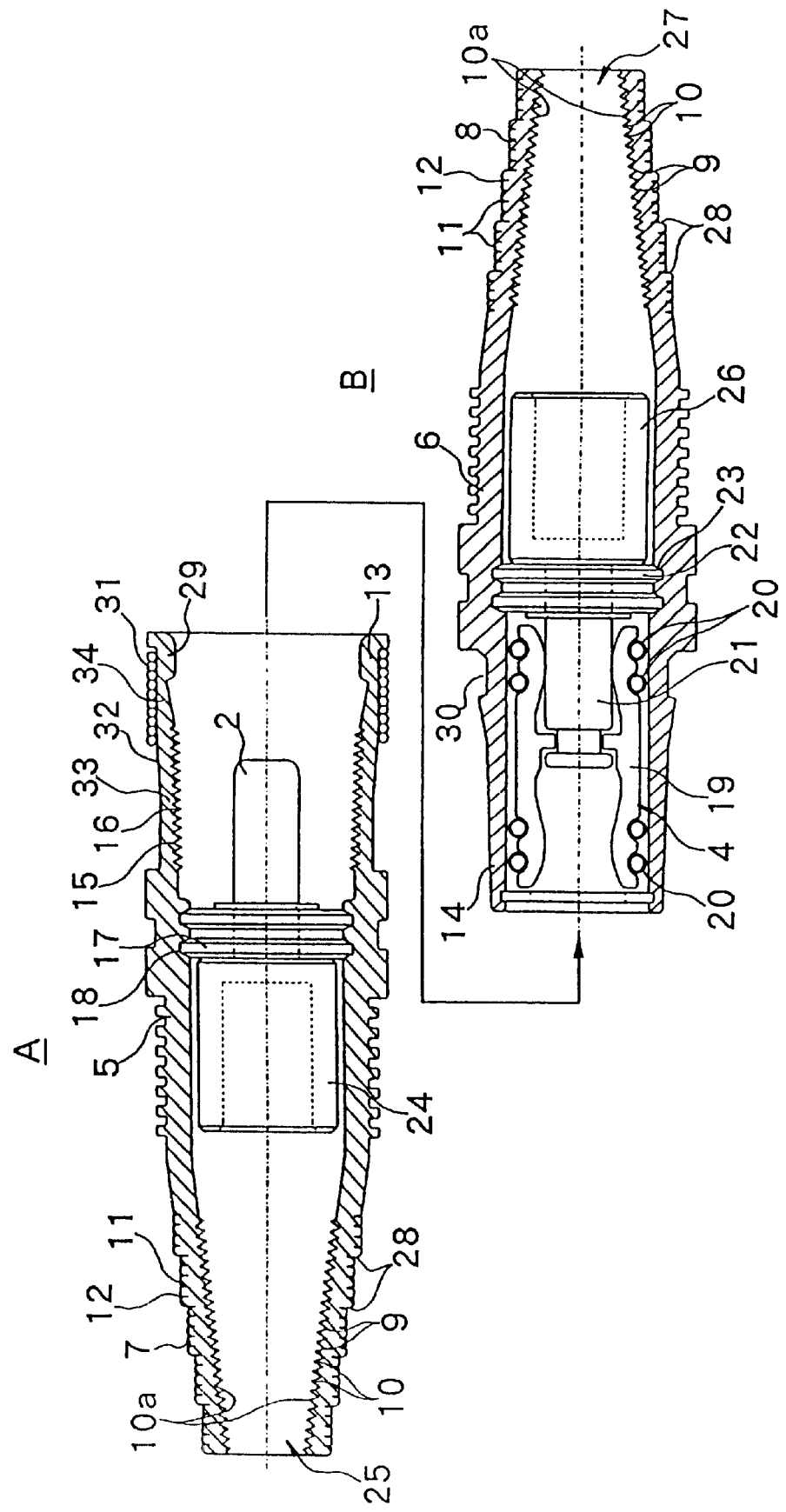
FIG. 1 is a sectional view showing a disconnecting state of a first and a second cylindrical connector.
Figure 2:
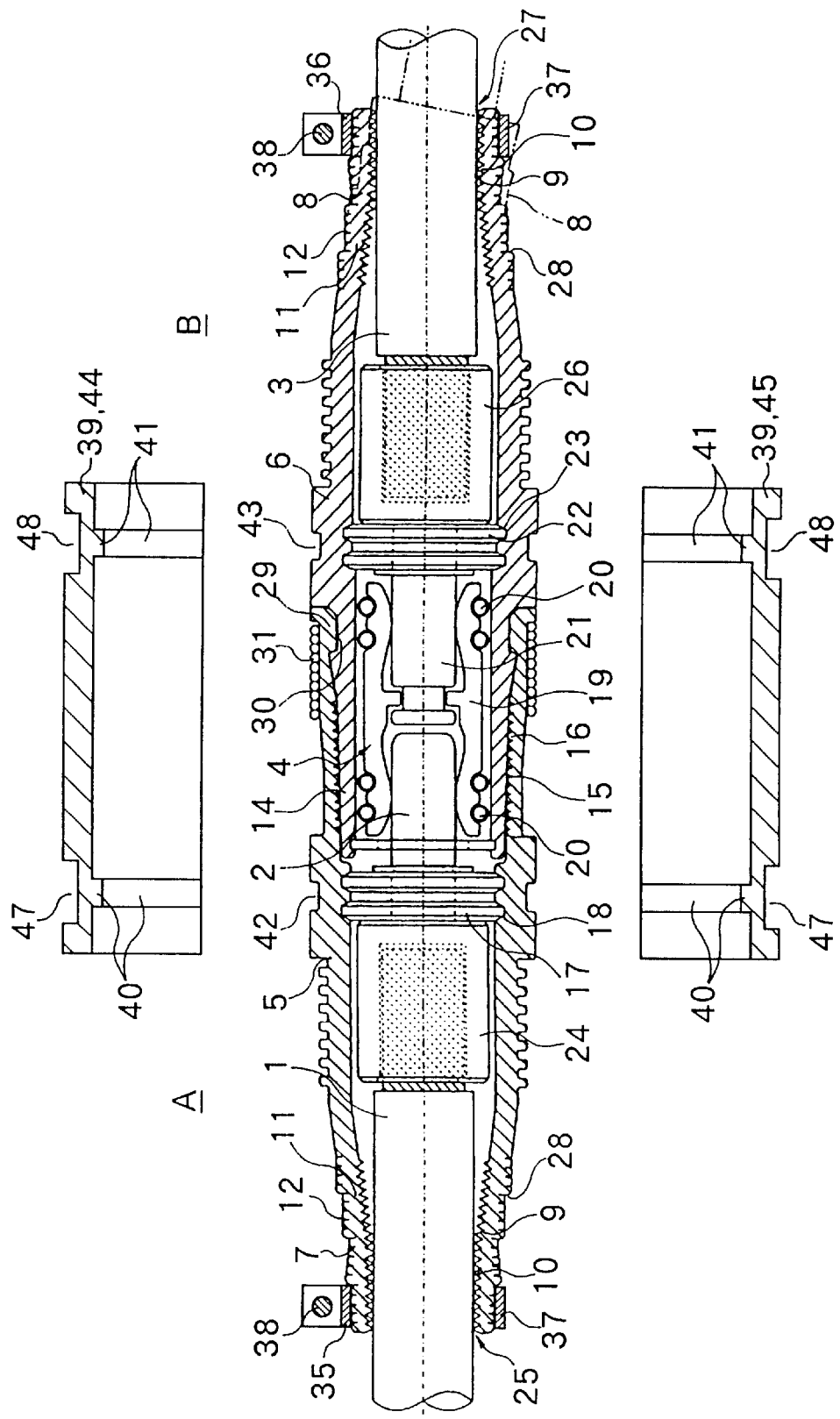
FIG. 2 is a sectional view showing a connecting state of the above first and second cylindrical connectors.

The present invention relates to a power source cable connector used for supplying a large electric power. As shown in FIGS. 1 through 3, the power source cable connector of the present invention includes a first cylindrical connector A attached to a terminal of a first power source cable 1, and a second cylindrical connector B attached to a terminal of a second power source cable 3. A first rod-like plug 2 disposed on the terminal of the first power source cable 1 which constitutes the first cylindrical connector A is removably inserted into a cylindrical receptacle 4 disposed on the terminal of the second power source cable 3 which constitutes the second cylindrical connector B. By doing so, the first power source cable 1 and the second power source cable 3 are connected together.

The rod-like plug 2 is housed in a first cylindrical casing 5 and the cylindrical receptacle 4 is housed in the second cylindrical casing 6.

A cable connecting sleeve 24 is integrally provided on a rear end of the first rod-like plug 2. A cable terminal is introduced through a cable inlet port 25 of the cylindrical casing 5, and its core wire is inserted into the cable connecting sleeve 24 and caulked.

The first rod-like plug 2 and the cable connecting sleeve 24 are integrally cut worked or integrally cast worked from a conductive metal.

The cylindrical receptacle 4 is formed by juxtaposing a plurality of conductive segments 19, which extend in an axial direction of the connector, in a cylindrical pattern and tightening an outer peripheral surface thereof with an annular spring 20 such that it can expand/contract in a radial direction.

The first rod-like plug 2 is press inserted into one end of the cylindrical receptacle 4 while expanding the cylindrical receptacle 4 against the effect of the spring 20, and a second rod-like plug 21 attached to a terminal of the second power source cable 3 is press inserted into the other end of the cylindrical receptacle 4 while expanding the cylindrical receptacle 4 against the effect of the spring 20.

A cable connecting sleeve 26 is integrally provided on a rear end of the second rod-like plug 21 as in the case with the first rod-like plug 2. A cable terminal is introduced through a cable inlet port 27 of the second cylindrical casing 6 and its core wire is inserted into the cable connecting sleeve 26 and caulked.

The second rod-like plug 21 and the cable connecting sleeve 26 are integrally cut worked or integrally cast worked from a conductive metal.

The first rod-like plug 2 having the cable connecting sleeve 24 is housed in the first cylindrical casing 5, and the second rod-like plug 21 having the cable connecting sleeve 26 and the cylindrical receptacle 4 are housed in the second cylindrical casing 6.

After the first and second power source cables 1, 3 are inserted through the cable connecting sleeves 24, 26, respectively, they are press inserted into the casings 5, 6, respectively.

The first cylindrical casing 5 and the second cylindrical casing 6 are formed from an elastic rubber or synthetic resin.

A first cable inlet cylindrical portion 7 having elasticity is integrally formed on a rear end of the first cylindrical casing 5, and a second cable inlet cylindrical portion 8 likewise having elasticity is integrally formed on a rear end of the second cylindrical casing 6.

A plurality of annular grooves 9 are juxtaposed on the inner peripheral surfaces of the first and second cable inlet cylindrical portions 7, 8 about a connector axis and in an axial direction, and annular ribs 10 each formed between every adjacent pair of grooves 9 intimately contact, in their compressed states, the outer peripheral surfaces of the first and second power source cables 1, 3 introduced into the sleeves.

The annular grooves 9 and the annular ribs 10 are designed to have a triangular configuration in cross-section. Particularly, the annular ribs 10 are designed to have a sharpened distal end 10a. The annular grooves and the annular ribs 10 have a mutually independent annular shape. The sharpened distal ends 10a of the respective annular ribs 10 intimately contact, in their compressed states, the outer peripheral surfaces of the first and second power source cables 1, 3. By this, the fluid tightness, i.e., effect of water-proof can be obtained at the cable inlet ports 25, 27.

The first and second cable inlet cylindrical portions 7, 8 are designed to have a tapered cylindrical configuration which is converged towards the rear ends. The annular grooves 9 and the annular ribs 10 are formed respectively on the inner peripheral surfaces of the first and second cable inlet cylindrical portions 7, 8 which are converged in conformity with the tapered cylindrical, first and second cable inlet cylindrical portions 7, 8.

The power source cables 1, 3 introduced respectively through the cable inlet ports 25, 27, are introduced while elastically widening the inlet ports 25, 27 and the cylindrical portions which form the inlet ports 25, 27, and while the annular ribs 10 are intimately contacted, in their compressed states.

The outer peripheral surfaces of the elastic, first and second cable inlet cylindrical portions 7, 8 on the rear ends of the first and second cylindrical casings 5, 6 are designed to have a multi-step construction in which the cylindrical portions 7, 8 are continuous through annular steps 28.

Figure 6:
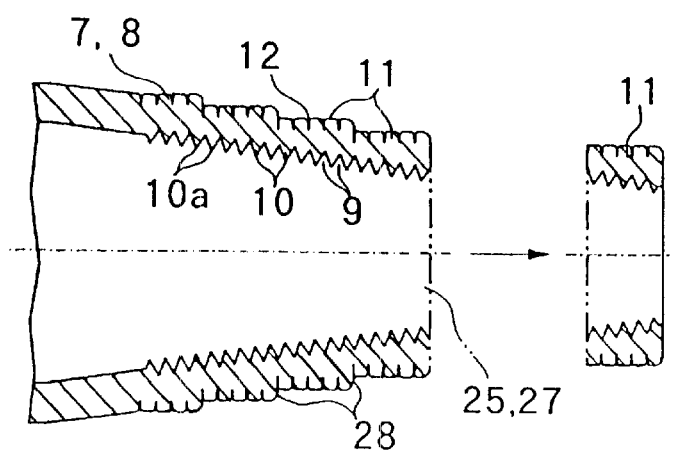
FIG. 6 is an enlarged sectional view for explaining a state in which the first and the second cable inlet cylindrical portion forming the first and the second cylindrical connector can be cut out.

That is to say, as shown in FIG. 6, the first and second cable inlet portions 7, 8 are designed to have a multi-step construction, in which a plurality of unit cylindrical portions 11, which are gradually reduced in diameter towards the rear ends, are continuous with each other through the annular steps 28. The unit cylindrical portions 11 are selected in accordance with the diameter of the first and second power source cables 1, 3, and the unit cylindrical portions 11 are cut off at the forming part of each annular step 28.

Thus, merely by cutting off the rear ends of the first and second casings 5, 6 at the beginning of a unit cylindrical portion 11, one power source cable connector, i.e., a pair of first and second cylindrical connectors A, B, can be applied to connect two or more kinds of power source cables having different diameters.

A plurality of annular grooves 12 are juxtaposed on the outer peripheral surface of each unit cylindrical portion 11 about a connector axis and in an axial direction.

As shown in FIG. 2, the first and second cable inlet cylindrical portions 7, 8 can be expanded contracted by their elasticity and they can be elastically bent. This bendability allows the first and second cable inlet cylindrical portions 7, 8 to be bent in compliance with the bending motion of the power source cable terminal, so that a cable bending load can be absorbed. The annular grooves 9, 12 enhance the bending capability of the first and second cable inlet cylindrical portions 7, 8.

The outer peripheral surface of the first cable inlet cylindrical portion 7 is tightened with a first tightening band 35, and the outer peripheral surface of the second cable inlet cylindrical portion 8 is tightened with a second tightening band 36.

Owing to the tightening with the first and second tightening bands 35, 36, the annular ribs 10 juxtaposed on the inner peripheral surfaces of the first and second cable inlet portions 7, 8 are compressed so as to ensure that they intimately contact the first and second power source cables 1, 3, thus enhancing the effect of fluid tightness.

At the same time, owing to the tightening with the first and second tightening bands 35, 36, the power source cables 1, 3 are pinched with increased force, thereby wholesomely maintaining the connection between the cables 1, 3 against a tensile force or twisting force exerted to the cables 1, 3.

As the first and second tightening bands 35, 36, for example, a C-shaped ring 37 as shown in FIG. 3(B) is fitted to the outer peripheral surfaces of the first and second cable inlet cylindrical portions 7, 8 and an open end of the C-shaped ring 37 is tightened with a screw 38. In the alternative, a tightening band made from a metal wire material is wound on the outer peripheral surfaces of the first and second cable inlet cylindrical portions 7, 8 and tightened.

Moreover, as previously mentioned, the first cylindrical casing 5 and the second cylindrical casing 6 are formed from rubber or synthetic resin having elasticity. An externally fitting cylindrical portion 13 having elasticity is integrally formed on a front end of one of the first and second cylindrical casings 5, 6, and an internally fitting cylindrical portion 14 having elasticity and fitted into the externally fitting cylindrical portion 13 is integrally formed on a front end of the other.

Figure 7:
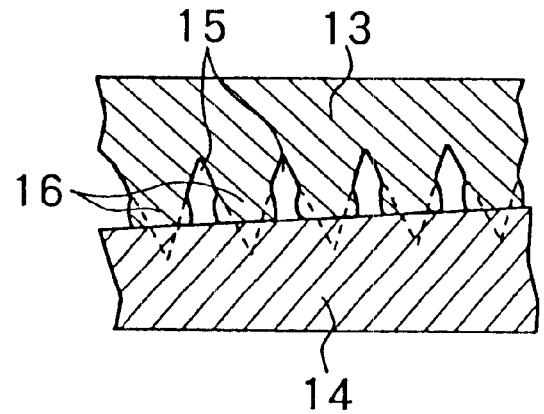
FIG. 7 is an enlarged sectional view showing a waterproof structure of a mutually fitting portion between an externally fitting cylindrical portion and an internally fitting cylindrical portion forming the first and the second cylindrical connector.
Figure 8:
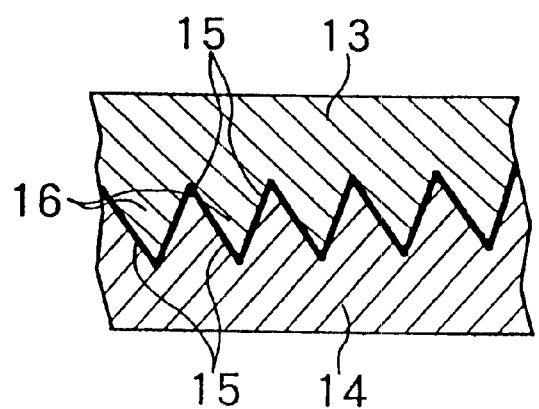
FIG. 8 is an enlarged sectional view showing another example of the mutually fitting portion.

As shown in FIGS. 7 and 8, a plurality of annular grooves 15 are juxtaposed on the inner peripheral surface of the externally fitting cylindrical portion 13 or on the outer peripheral surface of the internally fitting cylindrical portion 14 about the connector axis. When the internally fitting cylindrical portion 14 is fitted into the externally fitting cylindrical portion 13, the elastic annular ribs 16 formed between every pair of adjacent annular grooves 15, as shown in FIG. 7, intimately contact, in their compressed states, the outer peripheral surface of the internally fitting cylindrical portion 14 or the inner peripheral surface of the externally fitting cylindrical portion 13.

It is an interesting alternative that, as shown in FIG. 8, the annular grooves 15 are formed in both the inner peripheral surface of the externally fitting cylindrical portion 13 and the outer peripheral surface of the internally fitting cylindrical portion 14. Therefore, the annular ribs 16 formed between every pair of adjacent annular grooves 15 formed in either the externally fitting cylindrical portion 13 or the internally fitting cylindrical portion 14 intimately engages the annular grooves 15 formed in the other.

At the same time, in order to realize a locking condition between the externally fitting cylindrical portion 13 and the internally fitting cylindrical portion 14, (i.e., locking condition between the first and second cylindrical casings 5, 6), an annular claw 29 is formed on the inner peripheral surface at the front end of the externally fitting cylindrical portion 13. An annular engagement groove 30 is formed in the outer peripheral surface at the rear end of the internally fitting cylindrical portion 14. By elastically press inserting the annular claw 29 into the annular engagement groove 30, disengagement is prevented against a tensile force.

It is also accepted that the annular claw 29 is formed on the rear end outer peripheral surface of the internally fitting cylindrical portion 14, and the annular engagement groove 30 is formed in the front end inner peripheral surface of the externally fitting cylindrical portion 13.

A cylindrical protector 39 is externally fitted to the fitting portion between the ends of the externally fitting cylindrical portion 13 and the internally fitting cylindrical portion 14.

One end of the cylindrical protector 39 is engaged with the outer peripheral surface at the basal portion of the externally fitting cylindrical portion 13, and the other end of the cylindrical protector 39 is engaged with the outer peripheral surface at the basal portion of the internally fitting cylindrical portion 14. Therefore, a resisting force against a tensile force is produced, so that the connection is stably maintained.

The fitting portion is surrounded with the cylinder protector 39, thereby enchancing the effect of fluid tightness at the fitting portion. At the same time, the connection through the rod-like plugs 2, 21 and the cylindrical receptacle 4 is protected against an external impact at the fitting portion.

As means for engaging the cylindrical protector 39 with the externally fitting cylindrical portion 13 and the internally fitting cylindrical portion 14, for example, as shown in FIG. 3, ring like engagement ribs 40, 41 are integrally formed on the inner peripheral surfaces at each end of the cylindrical protector 39. The annular engagement rib 40 is engaged in an annular engagement groove 42 formed in the basal portion outer peripheral surface of the externally fitting cylindrical portion 13, and the annular engagement rib 41 is engaged in an annular engagement groove 43 formed in the basal portion outer peripheral surface of the internally fitting cylindrical portion.

Figure 4A:
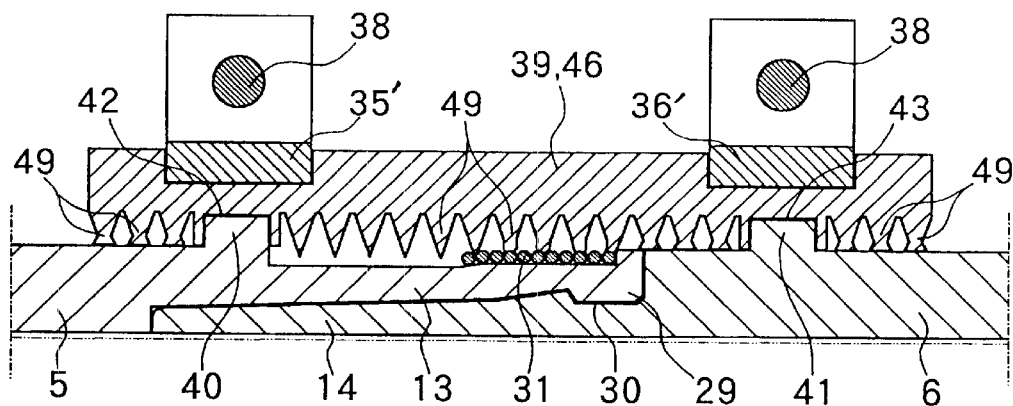
FIG. 4(A) is an enlarged vertical sectional view of an important portion showing another example of the cylindrical protector of FIG. 3.
Figure 4B:
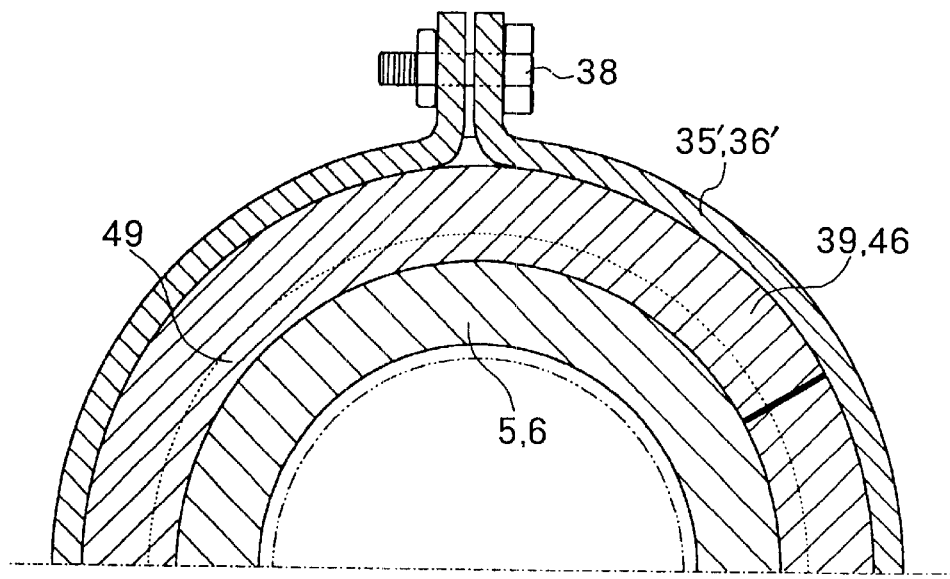
FIG. 4(B) is a cross sectional view thereof.
Figure 5:
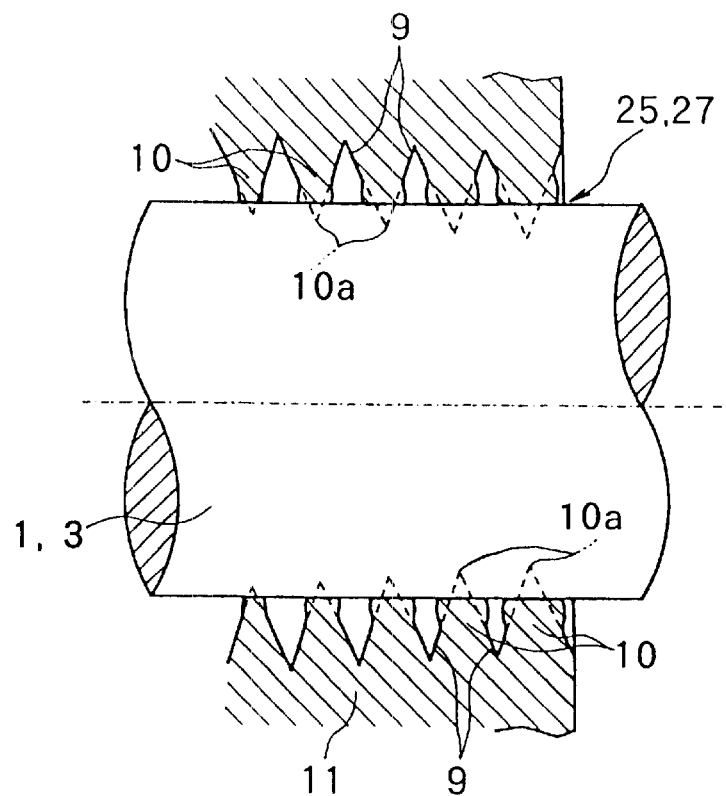
FIG. 5 is an enlarged sectional view showing a waterproof structure of a cable inlet portion in a first and a second cable inlet cylindrical portion forming the first and the second cylindrical connector.

As shown in FIG. 4, the annular engagement ribs 40, 41 can also be formed respectively on the outer peripheral surfaces of the externally fitting cylindrical portion 13 and the internally fitting cylindrical portion 14, and the annular engagement grooves 42, 43 can be formed respectively in each end of the inner peripheral surface of the cylindrical protector 39. Owing to this arrangement, the above mentioned engagement can be achieved.

As one example of the cylindrical protector 39, as shown in FIGS. 2 and 3, a pair of split cylindrical bodies 44, 45, which are split into two parts along the axial direction, are abutted along the outer peripheral surface of the casings 5, 6. Thereafter, third and fourth tightening bands 35', 36' are wound on the outer peripheral surfaces of the split cylindrical bodies 44, 45.

As another example of the cylindrical protector 39, as shown in FIG. 4, a split cylindrical body 46 having a split on a bus-line is pushed onto the fitting portion between the main portions of the casings 5, 6 from the side while dilating (or expanding) the body 46 against elasticity. Then, the third and fourth tightening bands 35', 36' are tightened on the split cylindrical body 46.

Annular tightening grooves 47, 48 are formed in each end of the outer peripheral surface of the cylindrical protector 39, i.e., split cylindrical bodies 44, 45, or 46. Within the annular tightening grooves 47, 48, the third and fourth tightening bands 35', 36' are wound on the protector 39 and tightened.

Preferably, the annular tightening grooves 47, 48 are provided at the same axial location as the annular engagement ribs 40, 41 and the annular engagement grooves 42, 43.

As the third and fourth tightening bands 35', 36', for example, a C-shaped ring 37 as shown in FIG. 3(B) is fitted to the outer peripheral surface of the cylindrical protector 39 and an open end of the C-shaped ring 37 is tightened with a screw 38. In the alternative, tightening bands 35', 36' made from a metal wire material are wound on the outer peripheral surface of the cylindrical protector 39 and tightened.

Owing to the tightening with the third and fourth tightening bands 35', 36', the compressive intimately contacted states between the internally fitting cylindrical portion 14 and the externally fitting cylindrical portion 13 is ensured through the annular ribs 16 juxtaposed on the inner peripheral surface of the externally fitting cylindrical portion 13 and/or on the outer peripheral surface of the internally fitting cylindrical portion 14. Thus, the effect of fluid tightness is enhanced.

Owing to the cylindrical protector 39, the connection is stably retained against a tensile force at the fitting portion between the first and second cylindrical casings 5, 6. At the same time, the connection is protected through the rod-like plugs 2, 21 and the cylindrical receptacle 4 against an external impact at the fitting portion.

A plurality of annular ribs 49 are juxtaposed on the inner peripheral surface of the cylindrical protector 39 of FIG. 3 or 4 about the axis and in the axial direction. The annular ribs 49 intimately contact, in their compressed states, the outer peripheral surface of the fitting portion between the casings 5, 6.

In order to better ensure the connection between the externally fitting cylindrical portion 13 and the internally fitting cylindrical portion 14, a coiled spring 31 is externally mounted on the outer peripheral surface of the externally fitting peripheral portion 13. A rear half portion of the externally fitting cylindrical portion 13 is dimensioned so as to be reduced in diameter and a front half thereof is dimensioned so as to be slightly larger in diameter than the rear half portion. The reduced diameter cylindrical portion 33 and the enlarged diameter cylindrical portion 34 are continuously formed through a slanted surface 32. By moving the coiled spring 31 to the reduced diameter cylindrical portion 33, restraint against the reduced diameter cylindrical portion 33 by the coiled spring 31 is canceled, and by moving the coiled spring 31 to the enlarged diameter cylindrical portion 34, a restraining state of the enlarged diameter portion 34 by the coiled spring 31 is realized. That is to say, a compression force is exerted against the enlarged diameter portion 34 by the coiled spring 31 to urge the externally fitting cylindrical portion 13 against the internally fitting cylindrical portion 14. By doing so, an engagement state and a fluid tight state are maintained by the annular ribs 16 and the annular claws 29.

By canceling the restraint by moving the coiled spring 31 to the reduced diameter portion 33, and by forcibly pulling the first and second cylindrical casings 5, 6 in mutually reversed directions, the engagement between the annular ribs 16 and the annular claws 29 are canceled and the insertion connection of the first rod-like plug 2 with respect to the cylindrical receptacle 4 is canceled. As an anchoring means for the first rod-like plug 2 with respect to the first cylindrical casing 5 constituting the first cylindrical connector A, an anchoring flange 17 of the rod-like plug 2 is unmovably externally fitted to the outer peripheral surface of the plug 2. In addition, an annular anchoring groove 18 is formed in the inner peripheral surface of the first cylindrical casing 5, and the anchoring flange 17 is press fitted to the interior of the annular anchoring groove 18 by utilizing the elasticity of the casing 5, so that the first rod-like plug 2 is retained at a predetermined location within the first cylindrical casing 5. Thus, a press inserted state of the first rod-like plug 2 with respect to the cylindrical receptacle 4 is retained.

As an anchoring means of the second rod-like plug 21 with respect to the second cylindrical casing 6 constituting the second cylindrical connector B, as previously mentioned, the cylindrical receptacle 4 is formed by juxtaposing a plurality of conductive segments 19, which extend in an axial direction of the connector, in a cylindrical pattern and tightening the outer peripheral surface thereof with the annular spring 20 such that it can expand/contract in a radial direction. The first rod-like plug 2 is press inserted into one end of the cylindrical receptacle 4 and the second rod-like plug 21 attached to the terminal of the second power source cable 3 is press inserted into the other end of the cylindrical receptacle 4. An anchoring flange 22 of the second rod-like plug 21 is externally fitted to the rear end outer peripheral surface of the plug 21. In addition, an annular anchoring groove 23 is formed in the inner peripheral surface of the second cylindrical casing 6, and the anchoring flange 22 is press fitted to the interior of the annular anchoring groove 23 by utilizing the elasticity of the casing 6, so that the second rod-like plug 21 is retained at a predetermined location within the second cylindrical casing 6. Thus, a press inserting state of the second rod-like plug 21 with respect to the cylindrical receptacle 4 is maintained.

Furthermore, as shown in FIG. 3A, anchoring flanges 17 and 22, and annular anchoring grooves 18 and 23 are located at the same axial position as the tightening grooves 47, 48. Therefore, the compressive force caused by the third and fourth tightening bands 35', 36' will be imparted to flanges 17, 22 and grooves 18, 23.

The foregoing description of one preferred embodiment of the present invention provides illustration and description, but is not intended to be exhaustive or to limit the invention to the precise form disclosed. Modifications and variations are possible in light of the above teachings or may be acquired from practice of the invention.

What is claimed is:

1. A power source cable connector comprising:

a rod-shaped plug for connecting a terminal of a first power source cable;

a cylindrical receptacle for connecting a terminal of a second power source cable;

a first cylindrical casing housing therein said rod-shaped-plug;

a second cylindrical casing housing therein said cylindrical receptacle;

a first cable inlet cylindrical portion formed on a rear end of said first cylindrical casing;

a second cable inlet cylindrical portion formed on a rear end of said second cylindrical casing;

an externally fitting cylindrical portion formed on a front end of said first cylindrical casing and having a basal portion, a first annular engagement groove being formed in an outer peripheral surface of said basal portion of said externally fitting cylindrical portion;

an internally fitting cylindrical portion formed on a front end of said second cylindrical casing and having a basal portion, a second annular engagement groove being formed in an outer peripheral surface of said basal portion of said internally fitting cylindrical portion, said internally fitting cylindrical portion being fitted into said externally fitting cylindrical portion and said rod-shaped plug being inserted into said cylindrical receptacle, thereby connecting said first power source cable and said second power source cable together;

a cylindrical protector externally fitted to an outer periphery of a fitting portion between said externally fitting cylindrical portion and said internally fitting cylindrical portion, a first annular engagement rib formed on an inner peripheral surface at a first end of said cylindrical protector being engaged in said first annular engagement groove of said basal portion of said externally fitting cylindrical portion, and a second annular engagement rib formed on said inner peripheral surface at a second end of said cylindrical protector being engaged in said second annular engagement groove of said basal portion of said internally fitting portion, a first annular tightening groove being arranged on an outer peripheral surface at said first end of said cylindrical protector, a second annular tightening groove being arranged on said outer peripheral surface at said second end of said cylindrical protector;

a first tightening band arranged in said first tightening groove for compressing said first end of said cylindrical protector, said first tightening band being located at a same axial position of said cylindrical protector as said first annular engagement rib such that a compression force of said first tightening band is imparted to said first annular engagement groove of said externally fitting cylindrical portion via said cylindrical protector; and a second tightening band arranged in said second tightening groove for compressing said second end of said cylindrical protector, said second tightening band being located at a same axial position of said cylindrical protector as said second annular engagement rib such that a compression force of said second tightening band is imparted to said second annular engagement groove of said internally fitting cylindrical portion via said cylindrical protector.

2. The power source cable connector according to claim 1, wherein said externally fitting cylindrical portion has an annular claw on an inner peripheral surface at a front end thereof, said internally fitting cylindrical portion having an annular engagement recess on an outer peripheral surface at a rear end thereof, said claw fitting within said engagement recess.

3. The power source cable connector according to claim 1, wherein at least one of an outer peripheral surface of said internally fitting cylindrical portion and an inner peripheral surface of said externally fitting cylindrical portion has a plurality of annular ribs formed thereon.

4. The power source cable connector according to claim 3, wherein said externally fitting cylindrical portion has an annular claw on said inner peripheral surface at a front end thereof, said internally fitting cylindrical portion having an annular engagement recess on said outer peripheral surface at a rear end thereof, said claw fitting within said engagement recess.

5. The power source cable connector according to claim 1, wherein said first cylindrical casing has an inner peripheral surface and a first annular anchoring groove formed in said inner peripheral surface, said cable connector further comprising a first anchoring flange having an inner peripheral surface fixed to an outer peripheral surface of said rod-shaped plug, and having an outer peripheral surface press-fitted into said first anchoring groove so as to retain said rod-shaped plug in said first cylindrical casing.

6. The power source cable connector according to claim 5, wherein said rod-shaped plug comprises a first rod-shaped plug inserted into a first end of said cylindrical receptacle and said second cylindrical casing has an inner peripheral surface and a second annular anchoring groove formed in said inner peripheral surface, said cable connector further comprising a second rod-shaped plug inserted into a second end of said cylindrical receptacle and a second anchoring flange having an inner peripheral surface fixed to an outer peripheral surface of said second rod-shaped plug, and having an outer peripheral surface press-fitted into said second anchoring groove so as to retain said second rod-shaped plug in said second cylindrical casing.

7. The power source cable connector according to claim 6, wherein said first tightening band is located at a same axial position of said cable connector as said first anchoring flange such that a compression force of said first tightening band is imparted to said first anchoring flange via said cylindrical protector and said first cylindrical casing; and wherein said second tightening band is located at a same axial position of said cable connector as said second anchoring flange such that a compression force of said second tightening band is imparted to said second anchoring flange via said cylindrical protector and said second cylindrical casing.

8. A power source cable connector according to claim 1, wherein said cylindrical protector is fabricated of a split cylindrical body and said split cylindrical body is tightened with a tightening band.

9. The power source cable connector according to claim 8, wherein said first cylindrical casing has an inner peripheral surface and a first annular anchoring groove formed in said inner peripheral surface, said cable connector further comprising a first anchoring flange having an inner peripheral surface fixed to an outer peripheral surface of said rod-shaped plug, and having an outer peripheral surface press-fitted into said first anchoring groove so as to retain said rod-shaped plug in said first cylinder casing.

10. The power source cable connector according to claim 9, wherein said rod-shaped plug comprises a first rod-shaped plug inserted into a first end of said cylindrical receptacle and said second cylindrical casing has an inner peripheral surface and a second annular anchoring groove formed in said inner peripheral surface, said cable connector further comprising a second rod-shaped plug inserted into a second end of said cylindrical receptacle and a second anchoring flange having an inner peripheral surface fixed to an outer peripheral surface of said second rod-shaped plug, and having an outer peripheral surface press-fitted into said second anchoring groove so as to retain said second rod-shaped plug in said second cylindrical casing.

11. The power source cable connector according to claim 10, wherein said first tightening band is located at a same axial position of said cable connector as said first anchoring flange such that a compression force of said first tightening band is imparted to said first anchoring flange via said cylindrical protector and said first cylindrical casing; and wherein said second tightening band is located at a same axial position of said cable connector as said second anchoring flange such that a compression force of said second tightening band is imparted to said second anchoring flange via said cylindrical protector and said second cylindrical casing.

12. A power source cable connector comprising:

a rod-shaped plug connecting a terminal of a first source cable;

a cylindrical receptable for connecting a terminal of a second power source cable;

a first cylindrical housing therein said rod-shaped plug;

a second cylindrical casing housing therein said cylindrical receptable;

a first cable inlet cylindrical portion formed on a rear end said first cylindrical casing;

a second cable inlet cylindrical portion formed on a rear end of said second cylindrical casing;

an externally fitting cylindrical portion formed on a front end of said first cylindrical casing and having a basal portion, a first annular engagement groove being formed in an outer peripheral surface of said basal portion of said externally fitting cylindrical portion;

an internally fitting cylindrical portion formed on a front end of said second cylindrical casing and having a basal portion, a second annular engagement groove being formed in an outer peripheral surface of said basal portion of said internally fitting cylindrical portion, wherein by fitting said internally fitting cylindrical portion into said externally fitting cylindrical portion, said rod-shaped plug is inserted into said cylindrical receptable to thereby connect said first and second power source cables together;

annular ribs juxtaposed on inner peripheral surfaces of said first cable inlet cylindrical portion and said second cable inlet cylindrical portion so as to tightly contact outer peripheral surfaces of the first and second power source cables when in compressed states so as realize a fluid tight condition;

a cylindrical protector externally fitted to an outer periphery of a fitting portion between said externally fitting cylindrical portion and said internally fitting cylindrical portion, first annular engagement rib formed on an inner peripheral surface at a first end of said cylindrical protector being engaged in said first annular engagement groove of said basal portion of said externally fitting cylindrical portion, and a second annular engagement rib formed on said inner peripheral surface at a second end said cylindrical protector being engaged in said second annular engagement groove of said basal portion of said internally fitting portion, a first annular tightening groove being arranged on an outer peripheral surface at said first end of said cylindrical protector, a second annular tightening groove being arranged on said outlet peripheral surface at said second end of said cylindrical protector;

a first tightening band arranged in said first tightening groove for compressing said first end of said cylindrical protector, said first tightening band being located at a same axial position of said cylindrical protector as said first annular engagement rib such that a compression force of said first tightening band is imparted to said first annular engagement groove of said externally fitting cylindrical portion via said cylindrical protector; and a second tightening band arranged in said second tightening groove for compressing said second end of said cylindrical protector, said second tightening band being located at a same axial position of said cylindrical protector as said second annular engagement rib such that a compression force of said second tightening band is imparted to said second annular engagement groove of said internally fitting cylindrical portion via said cylindrical protector;

a third tightening band for tightening an outer peripheral surface of said first cable inlet cylindrical portion; and a fourth tightening band for tightening an outer peripheral surface of said second cable inlet cylindrical portion.

13. The power source cable connector according to claim 12, wherein said externally fitting cylindrical portion has an annular claw on an inner peripheral surface at a front end thereof, said internally fitting cylindrical portion having an annular engagement recess on an outer peripheral surface at a rear end thereof, said claw fitting within said engagement recess.

14. The power source cable connector according to claim 12, wherein at least one of an outer peripheral surface of said internally fitting cylindrical portion and an inner peripheral surface of said externally fitting cylindrical portion has a plurality of annular ribs formed thereon.

15. The power source cable connector according to claim 14, wherein said externally fitting cylindrical portion has an annular claw on said inner peripheral surface at a front end thereof, said internally fitting cylindrical portion having an annular engagement recess on said outer peripheral surface at a rear end thereof, said claw fitting within said engagement recess.

16. The power source cable connector according to claim 12, wherein said first cylindrical casing has an inner peripheral surface and a first annular anchoring groove formed in said inner peripheral surface, said cable connector further comprising a first anchoring flange having an inner peripheral surface fixed to an outer peripheral surface of said rod-shaped plug, and having an outer peripheral surface press-fitted into said first anchoring groove so as to retain said rod-shaped plug in said first cylindrical casing.

17. The power source cable connector according to claim 16, wherein said rod-shaped plug comprises a first rod-shaped plug inserted into a first end of said cylindrical receptacle and said second cylindrical casing has an inner peripheral surface and a second annular anchoring groove formed in said inner peripheral surface, said cable connector further comprising a second rod-shaped plug inserted into a second end of said cylindrical receptacle and a second anchoring flange having an inner peripheral surface fixed to an outer peripheral surface of said second rod-shaped plug, and having an outer peripheral surface press-fitted into said second anchoring groove so as to retain said second rod-shaped plug in said second cylindrical casing.

18. The power source cable connector according to claim 17, wherein said first tightening band is located at a same axial position of said cable connector as said first anchoring flange such that a compression force of said first tightening band is imparted to said first anchoring flange via said cylindrical protector and said first cylindrical casing; and wherein said second tightening band is located at a same axial position of said cable connector as said second anchoring flange such that a compression force of said second tightening band is imparted to said second anchoring flange via said cylindrical protector and said second cylindrical casing.

19. A power source cable connector according to claim 12, wherein said cylindrical protector is fabricated of a split cylindrical body and said split cylindrical body is tightened with a tightening band.

20. The power source cable connector according to claim 19, wherein said first cylindrical casing has an inner peripheral surface and a first annular anchoring groove formed in said inner peripheral surface, said cable connector further comprising a first anchoring flange having an inner peripheral surface fixed to an outer peripheral surface of said rod-shaped plug, and having an outer peripheral surface press-fitted into said first anchoring groove so as to retain said rod-shaped plug in said first cylindrical casing.

21. The power source cable connector according to claim 20, wherein said rod-shaped plug comprises a first rod-shaped plug inserted into a first end of said cylindrical receptacle and said second cylindrical casing has an inner peripheral surface and a second annular anchoring groove formed in said inner peripheral surface, said cable connector further comprising a second rod-shaped plug inserted into a second end of said cylindrical receptacle and a second anchoring flange having an inner peripheral surface fixed to an outer peripheral surface of said second rod-shaped plug, and having an outer peripheral surface press-fitted into said second anchoring groove so as to retain said second rod-shaped plug in said second cylindrical casing.

22. The power source cable connector according to claim 21, wherein said first tightening band is located at a same axial position of said cable connector as said first anchoring flange such that a compression force of said first tightening band is imparted to said first anchoring flange via said cylindrical protector and said first cylindrical casing; and wherein said second tightening band is located at a same axial position of said connector as said second anchoring flange such that a compression force of said second tightening band is imparted to said second anchoring flange via said cylindrical protector and said second cylindrical casing.

* * * * *